United States Patent [19]
Brown et al.

[11] 3,772,072
[45] Nov. 13, 1973

[54] METHOD FOR TREATING REVERSE OSMOSIS MEMBRANES

[75] Inventors: Barry M. Brown; Elbert L. Ray, both of Rochester, N.Y.

[73] Assignee: Eastman Kodak Company, Rochester, N.Y.

[22] Filed: June 14, 1971

[21] Appl. No.: 153,071

[52] U.S. Cl.................. 117/144, 210/500, 264/41, 264/49
[51] Int. Cl. ............................................. C08j 1/38
[58] Field of Search..................... 117/144; 210/500; 264/41, 49

[56] References Cited
UNITED STATES PATENTS

| | | | |
|---|---|---|---|
| 3,567,809 | 3/1971 | Veno et al. | 264/41 |
| 3,592,672 | 7/1971 | Rowley et al. | 264/41 X |
| 3,646,179 | 2/1972 | Stana | 264/41 |

OTHER PUBLICATIONS

Investigation & Preparation of Polymer Films to Improve the Separation of Water & Salts in Saline Water Conversion, U.S. Office of Saline Water R & D Progress Report No. 69, December, 1962, pp. 58–61.

Vos, Kenneth D. et al., Drying Cellulose Acetate Reverse Osmosis Membranes, pp. 84–89, Mar. 1969.

*Primary Examiner*—William D. Martin
*Assistant Examiner*—M. R. Lasignan
*Attorney*—William T. French et al.

[57] ABSTRACT

A single phase temperature independent imbibing solution for cellulose ester or ether reverse osmosis membranes consists essentially of (a) 30–60 percent grycerin; (b) 25–55 percent water; (c) 3–10 percent nonionic first surface active agent such as a polythylene glycol ether of C11–C15 linear alcohol; and (d) 0.1–5 percent of a second surface active agent which is either anionic (eg. the dioctyl ester of sodium sulfosuccinic acid, or the sodium sulfate derivative of 7 ethyl-2 methyl -4-undecanol), or cationic (eg. C8–C18 alkyl dimethyl benzyl ammonium chloride). In the method, a cellulose ester or ether reverse osmosis membrane in a water-wet condition is immersed in the novel imbibing solution, and then is removed and dried under ambient conditions, or by exposing it to heated air.

8 Claims, No Drawings

METHOD FOR TREATING REVERSE OSMOSIS MEMBRANES

BACKGROUND OF THE INVENTION

1. Field of the Invention

Our invention relates to novel imbibing solutions for treating cellulose ester reverse osmosis membranes; and to a novel method for treating such membranes to preserve their desalination parameters in the dry condition.

2. The Prior Art

In the production of dry reverse osmosis membranes of cellulose acetate or other cellulose esters and ethers, it is known to cast the membrane from a solution of the ester or ether in a volatile organic solvent system, quench the solvent-wet membrane in water to develop an active surface layer, temper by immersion in hot water, treat the tempered membrane with an imbibing solution which assures that the membrane's desalination parameters are preserved after subsequent drying of the membrane, and then dry the membrane.

Such a method, and an imbibing solution for use therein, is described in an article by K. D. Vos and F. O. Barris, Jr. entitled "Drying Cellulose Acetate Reverse Osmosis Membrane" in I & E C Product Research and Development, Vol. 8, No. 1, pages 84–89 (Mar. 1969). This article describes imbibing solutions containing individual surface active agents which are nonionic, or anionic, or cationic, or amphoteric, but not combinations; also combinations of such agents individually with glycerol or ethylene glycol.

An imbibing solution of the prior art has consisted of glycerin, for example 30 percent by weight; a nonionic surface active agent such as a polyethylene glycol ether of a C11–C15 linear alcohol sold under the trademark Tergitol 15S7, for example 4 percent by weight; balance water. This imbibing solution has been successfully used to produce uniformly hazy dry membranes with no loss in desalination parameters on many types of membranes, such as Eastman RO–89, RO–94, RO–97 and HF–35 cellulose acetate membranes, when the temperature of the solution is maintained between 58°–68°F. (14°–20°C.) However, when the heat temperable type of RO membrane (e.g. Eastman HT–00) is imbibed in such a prior art solution and then dried, it sometimes appears undesirably clear and transparent and there is considerable loss in flux.

It has been observed that when the imbibing solution temperature is below or above the 58°–68°F. range, undesirable coacervation occurs as shown by separation of the solution into two distinct phases, with all the components being present in both phases, but in different proportions. With different concentrations of components in imbibing solutions, the same phenomenon of coacervation occurs at different temperatures, for example coacervation occurs above or below the range 95°–110°F. (35°–44°C.) when the solution consists of 48 percent glycerin, 4 percent Tergitol 15S7, balance water.

SUMMARY OF THE INVENTION

In accordance with our invention, the problems of coacervation and of inconsistent results on some RO membranes have been overcome by forming an imbibing solution which consists essentially of glycerin, water and both (a) a non-ionic surface active agent and (b) either a cationic or an anionic surface active agent. This solution remains homogeneous at all temperatures, without coacervation and causes no loss of desalination parameters in any RO membrane types. Consequently, it is not necessary to exert such careful temperature control as was previously true.

A suitable nonionic surface active agent is a polyethylene glycol ether of C11–C15 linear alcohol sold by Union Carbide Corporation under the trademark Tergitol 15S7.

A suitable cationic surface active agent is an alkyl dimethyl benzyl ammonium chloride wherein said alkyl group has eight to 18 carbon atoms, such as is sold by Sterwin Chemicals Inc. under the trademark Roccal.

Suitable anionic surface active agents are the dioctyl ester of sodium sulfosuccinic acid sold by American Cyanamid Co. under the trademark Aerosol OT, and the sodium sulfate derivative of 7 ethyl-2 methyl-4-undecanol sold by Union Carbide Corporation under the trademark Tergitol 4.

In general, the imbibing solutions should consist essentially of, by weight, 30–60 precent glycerin, 3–10 percent of non-ionic surface active agent, 0.1–5 percent of the cationic or anionic surface active agent, and the balance (33–55 percent) water. The lower the percentages of nonaqueous ingredients, the longer is the time required for immersion of a membrane in the imbibing solution.

Further in accordance with our invention, there is provided a novel method for treating a cellulose ester reverse osmosis membrane comprising immersing such a membrane in a water-wet condition in an imbibing solution having the novel composition described herein, and then removing and drying the membrane. Drying can be accomplished by simply exposing the membrane to ambient air for a period of hours, or by exposing it in an oven to a current of heated air such as at 115°–220°F for a much shorter time, such as 1–3 minutes or less.

Sometimes it is desirable to imbibe and dry a membrane, then heat temper this dry membrane by immersing it in hot water, followed by reimbibing and drying. Primarily heat tempering is a mechanism for controlling the properties of the membrane that determine the percent salt rejection, and it is accomplished by immersing the membrane in hot water at a temperature such as in the range 160°–190°F. The higher the tempering temperature the greater is the percent salt rejection and the lesser is the flux. The tempering time is also significant, and membranes can be tempered for various time periods at any temperature to tailor them to provide from 20 to more than 99 percent salt rejection.

THE PREFERRED EMBODIMENTS

In the following examples, a 2-inch diameter dry disc of RO membrane is placed in a test cell, and backed up with a 0.45 Millopore filter disc and a porous stainless steel disc having a mean pore diameter of 5, both being on the side of the RO membrane disc remote from its active layer or surface. An aqueous salt solution containing 0.5% NaCl is fed to the active surface of the RO membrane at a pressure of 600 psig and a flow rate of 800 cc/minute through a flow channel 0.030 inch wide. The product water passing through the RO membrane is collected for 30 minutes (after a 20 ml wash has been collected and discarded) and salt content and flux are determined. The desalination properties of the membrane are expressed as percent salt rejection, and as product water flux in gallons per square foot of membrane surface per 24 hour day. Salt rejection is calculated as follows:

Percent salt rejection =

$$\frac{\text{salt in feed} - \text{salt in product water}}{\text{salt in feed}} \times 100$$

EXAMPLE 1

Wet membranes are prepared by casting onto a glass plate an acetone:formamide solvent liquid mixture (60:40) containing dissolved solid cellulose acetate, at a liquid: solids ratio of 3:1. The membrane is quenched in water at 34°F (2°C) after a brief exposure to moving air for partial evaporation of solvent. The wet membrane is dipped in a solution of 55 percent glycerin 4 percent Tergitol 15S7 (nonionic), 0.5 percent Roccal (cationic), and 50.5 percent water for 10 seconds, the excess is wiped off, and the membrane is dried in air under ambient conditions for 3 hours. The dry desalination parameters are 210 gal/ft$^2$/day at 20 percent rejection. This is comparable to the wet membrane desalination parameters of 210 gal/ft$^2$/day at 15 percent rejection.

Samples of the dry membrane are then tempered by dipping in hot water at 168°F and 180°F. (79°C and 82°C). The tempered desalination parameters are 65 gal/ft$^2$/day at 80 percent rejection when tempered 1 minute at 168°F., and 48 gal/ft$^2$/day at 86.4 percent rejection when tempered 1 minute at 180°F. respectively, which coincides with the desalination parameters generally obtained with a wet heat tempered HT-00 membrane.

EXAMPLE 2

A similar standard freshly cast wet membrane is quenched with cold water at 34°F. (2°C.), dipped in a solution of 55 percent glycerin, 4 percent Tergitol 15S7 (nonionic), 0.5 percent Aerosol OT (anionic) and 50.5 percent water for 10 seconds, the excess solution is wiped off and the membrane is dried under ambient conditions for 3 hours. Samples of the dry membrane are then tempered by dipping in hot water at 182°F. (85°C.) for 1 minute. The membrane has desalination parameters comparable to the membrane of Example 1 dried with Roccal (21.3 gal/ft$^2$/day at 97 percent rejection).

EXAMPLE 3

Under the conditions of Example 1, 1.0 percent Tergitol 4 (anionic) sodium sulfate derivative of 7-ethyl-2 methyl-4-undecanol is substituted for the 0.5 percent Roccal in the imbibing solution. Similarly good desalination parameters are obtained.

While several specific examples of nonionic, anionic, and cationic surface active agents have been described above, it is evident that many others can be selected to give equivalent results, as long as they are compatible with the other ingredients of the imbibing solutions.

Examples of such organic surface active agents include anionic surfactants such as sulfates and sulfonated alkyl, aryl, alkyl-aryl hydrocarbons and alkali metal salts thereof, for example sodium salts of long chain alkyl sulfates, sodium salts of alkyl naphthalene sulfonic acids, sodium salts of abietenes, sodium salts of alkyl benzene sulfonic acids, particularly those in which the alkyl group contains from about eight to 24 carbon atoms, sodium salts of sulfonated mineral oils, sodium salts of sulfosuccinic acid esters such as sodium dioctyl sulfosuccinate and the like.

Organic nonionic surface active agents which may be used include products formed by condensing one or more alkylene oxides of two to four carbon atoms, such as ethylene oxides or propylene oxides, preferably ethylene oxide alone or with other alkylene oxides with a relatively hydrophobic compound such as a fatty alcohol, fatty acid, sterol, a fatty glyceride, a fatty amide, a fatty mercaptan, tall oil fatty acids, etc. Other nonionic surface active agents which may be used include those products produced by condensing one or more relatively lower alkyl alcohol amines (for example methanolamine ethanolamine, propanolamine, etc.) with a fatty acid such as lauric acid, cetyl acid, tall oil fatty acid, abietic acid, etc. to produce the corresponding amide. Other typical examples of these categories of anionic and nonionic surface active agents are described in Schwartz and Perry "Surface Active Agents," Interscience Publishers, New York (1949) and The Journal of American Oil Chemists Society vol. 34, No. 4, pages 170–216 (Apr., 1957).

Some additional specifically useful agents are listed below:

Nonionic Agents

| Chemical Compositions | Trade Name and Source |
|---|---|
| Dodecyl phenoxy polyethoxyethanol | Sterox D—Monsanto Co. |
| Isooctyl phenoxy polyethoxyethanol | Triton X-100—Rohm & Haas Co. |
| Poly(vinyl alcohol) | Elvanol 72-60—DuPont |
| Poly(vinyl methyl ether) | Lutanol M40—BASF Colors & Chemicals, Inc. |
| Oxyethylated straight chain alcohol/Plurofac A- | 24—Wyandotte Chemicals |
| Ethylene oxide-ester condensate | Zonyl A—DuPont |

Anionic Agents

| Chemical Compositions | Trade Name and Source |
|---|---|
| Polyoxyethylene sorbitan monoborate | Tween 20—Atlas Chemical Co. |
| Sodium lauryl sulfate | Duponal C—DuPont |

Cationic Agents

| Chemical Composition | Trade Name and Source |
|---|---|
| Ethanolated alkyl guanidine amine complex | Aerosol C—61—American Cyanamid |
| n-alkyl(C14-C16)dimethyl benzyl ammonium chloride | Hyamine 3500—Rohm & Haas Co. |

The imbibing solutions and method of using same, as described above, are highly advantageous because they are equally beneficial for successfully treating all commercially available cellulose ester and ether RO membranes so that they can be dried, and yet maintain their RO properties after shipping and storing. Moreover, these solutions are particularly beneficial because they do not coacervate, thus making precise temperature control unnecessary.

The invention has been described in detail with particular reference to preferred embodiments thereof, but it will be understood that variations and modifications can be effected within the spirit and scope of the invention.

We claim:

1. In a method for treating a cellulose ester or ether reverse osmosis membrane comprising immersing such a membrane in a water-wet condition in an imbibing solution, and then removing and drying said membrane, the improvement wherein said imbibing solution is a single phase temperature independent imbibing solution by weight consisting essentially of: about 30 to 60 percent of glycerin; about 25 to 55 percent of water; and 3 to 10 percent of a nonionic first surface active agent; and about 0.1 to 5 percent of a second surface active agent selected from the group consisting of anionic and cationic surface active agents, said solution remaining homogeneous and free of coacervation at imbibing temperatures.

2. In a method in accordance with claim 1, said imbibing solution wherein said anionic surface active agent is dioctyl ester of sodium sulfosuccinic acid.

3. In a method in accordance with claim 1, said imbibing solution wherein said anionic surface active agent is sodium sulfate derivative of 7-ethyl-2-methyl-4-undecanol.

4. In a method for treating a cellulose ester or ether reverse osmosis membrane comprising immersing such a membrane in a water-wet condition in an imbibing solution, and then removing and drying said membrane, the improvement wherein said imbibing solution is a single phase temperature independent imbibing solution which remains homogeneous at imbibing temperatures without coacervation and without causing substantial loss of desalination parameters by said membrane, said solution consisting essentially of: about 30 to 60 percent of glycerin; about 25 to 55 percent of water; about 3 to 10 percent of a nonionic first surface active agent; and about 0.1 to 5 percent of a second surface active agent selected from the group consisting of anionic and cationic surface active agents, all percentages being by weight, said nonionic surface active agent being (a) a product formed by condensing one or more alkylene oxides of two to four carbon atoms alone or with other alkylene oxides with a relatively hydrophobic compound selected from a fatty alcohol, fatty acid, sterol, fatty glyceride, fatty amide, fatty mercaptan or tall oil fatty acids, or (b) a product formed by condensing one or more lower alkyl alcohol amines with a fatty acid; said anionic surface active agent being selected from sulfates and sulfonated alkyl, aryl, alkylaryl hydrocarbons and alkali-metal salts thereof; and said cationic surface active agent being an alkyl dimethyl benzyl ammonium chloride wherein said alkyl group has eight to 18 carbon atoms.

5. In a method in accordance with claim 4, an imbibing solution wherein said second surface active agent is an alkyl dimethyl benzyl ammonium chloride wherein said alkyl group has 8 to 18 carbon atoms, as a cationic surface active agent.

6. In a method in accordance with claim 4, an imbibing solution wherein said second surface active agent is the dioctyl ester of sodium sulfosuccinic acid, as an anionic surface active agent.

7. In a method in accordance with claim 4, an imbibing solution wherein said second surface active agent is the sodium sulfate derivative of 7 ethyl-2 methyl-4-undecanol, as an anionic surface active agent.

8. In a method in accordance with claim 4, an imbibing solution wherein said nonionic surface active agent is a polyethylene glycol ether of C11–C15 linear alcohol; wherein said anionic surface active agent is selected from the group consisting of the dioctyl ester of sodium sulfosuccinic acid and the sodium sulfate derivative of 7 ethyl-2 methyl-4-undecanol; and said cationic surface active agent is an alkyl dimethyl benzyl ammonium chloride wherein said alkyl group has eight to 18 carbon atoms.

* * * * *